2,715,905

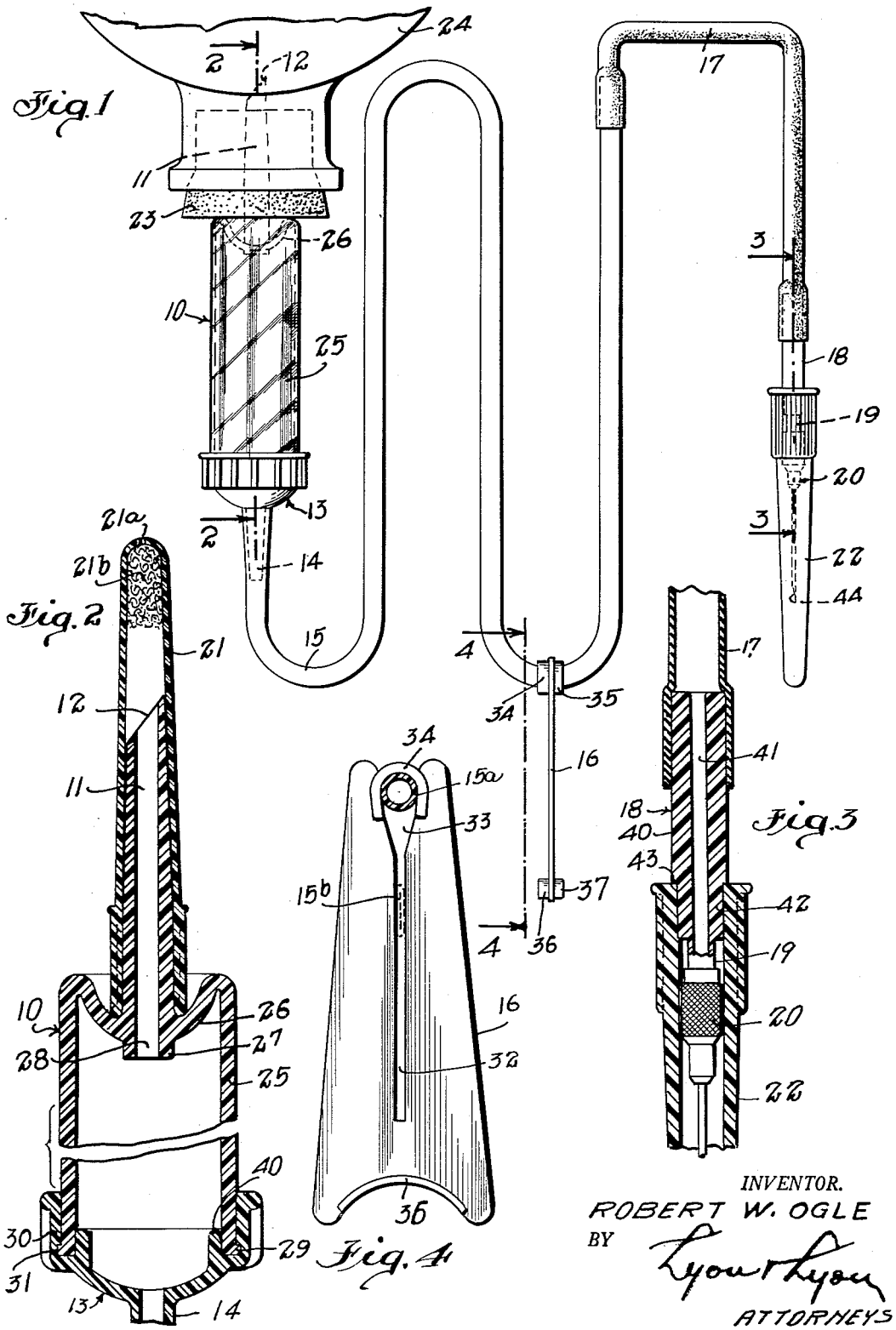

INTRAVENOUS INJECTION SET

Robert W. Ogle, Malibu, Calif.

Application November 16, 1953, Serial No. 392,276

2 Claims. (Cl. 128—214)

This invention relates to an intravenous injection set and more particularly to a disposable, all plastic aseptic set characterized by the fact that the set, as supplied to the user, is provided with aseptically sealed plastic caps at each end of the set to maintain sterility; is provided with an integral bevelled cannula for abrasion free, non coring entry through the rubber solution stopper; and is provided with a clear view plastic drip meter barrel with a special conical drip indicator.

It is accordingly one object of this invention to provide an intravenous injection set which, by reason of the economy in its manufacture, can be used once and then discarded.

It is a further object of this invention to provide such a disposable intravenous injection set which, as supplied to the user, is aseptically sealed.

It is a further object of this invention to provide such a disposable intravenous injection set having the aforesaid features and providing an improved drip meter barrel to facilitate counting of the drops administered.

It is a further object of this invention to provide such a disposable intravenous injection set in which the drip meter barrel is provided with a flexible funnel adaptor which increases the reservoir area of the lower portion of the drip meter barrel.

These and other objects and advantages of the invention will be apparent from the annexed specification in which:

Figure 1 is a side view of an intravenous injection set shown associated with the supply bottle and stopper.

Figure 2 is an enlarged longitudinal section of the flow meter taken on the line 2—2 of Figure 1.

Figure 3 is an enlarged longitudinal section taken on the line 3—3 of Figure 1.

Figure 4 is an enlarged section taken on the line 4—4 of Figure 1.

Referring now more particularly to the drawings, the intravenous injection set of this invention includes a drip meter barrel 10 formed of clear polystyrene plastic and having integrally formed therewith a plastic cannula 11 sharply bevelled as at 12. The lower end of the barrel 10 is provided with a flexible, preferably polyethylene plastic, funnel 13 on the tube 14 of which there is attached a flexible plastic tubing 15, preferably formed of vinyl acetate. A clamp 16 is provided substantially midway of the tube 15, and on the end of the tube 15 there is mounted a tube 17 of self-sealing latex. In the end of the tube 17 there is mounted the upper end of a visible flow adaptor 18, preferably formed of polyethylene plastic, having a luer taper section 19 for receipt thereon of a luer taper intravenous needle 20.

As supplied to the user, the cannula 11 will be sealed by a plastic cap 21 having an opening 21a in the tip adjacent which the cap is provided with a pad of absorbent cotton 21b, and the needle 20 will be sealed by a plastic cap 22. When in use, the caps 21 and 22 are, of course, removed, and the cannula 11 is inserted through the stopper 23 of a supply bottle 24.

The drip meter 10 is of novel arrangement and includes a generally cylindrical barrel 25 having an inwardly dished upper end 26 with a boss 27 formed therein. It will be appreciated that the boss 27 is in effect a continuation of the cannula 11, and like the cannula 11 is provided with a central opening or bore 28. It has been found that by dishing the upper end 26 as indicated and extending the same by means of the boss 27, drops of fluid passing down the cannula 11 from the bottle 24 into the drip meter 10 form upon the boss 27 in clear easily counted drops which greatly facilitates the accurate measurement of the amount of fluid being supplied. The lower end of the drip meter 10 is provided with an externally extending annular flange 29, and the funnel 13 is provided with a generally cylindrical portion 30 having an annular groove 31 at its lower end adapted to receive the flange 29 in tight sealing relation. An upstanding ring 40 engages the lower end of the inner wall of the meter 10 with a press fit securely sealing same. However, since the funnel 13 is formed of flexible polyethylene plastic, the funnel may be inserted on the drip meter 10 with the flange 29 thus seated in the groove 31 by a snap action.

The flow meter clamp 16 is shown in detail in Figure 4 and comprises a flat plate preferably of polystyrene plastic having a slot 32 extending part way longitudinally thereof, at the upper end of which the slot is enlarged as at 33 and reinforced and closed by ribs 34 and 35 disposed as indicated in Figures 1 and 4. The other end of the clamp 16 is preferably concave and provided with flanges 36 and 37 which form a convenient thumb rest for the operator. It will be appreciated that the tube 15 passes through the clamp 16 and, when shown in the position shown at 15a in Figure 4, will permit unrestricted flow, while when shown in the position shown at 15b in Figure 4 will be clamped shut. Any degree of control between these two extremes can be achieved in moving from the position shown in 15a towards the position shown in 15b due to the tapered edges of the enlarged section 33.

The flow adaptor 18 is most easily described in connection with Figure 3 and is there shown to comprise a generally cylindrical portion 40 with a central bore 41, on the upper end of which there is received the lower end of the self-sealing latex tube 17. The cylindrical portion 40 is reduced as at 42 to provide a shoulder 43 which forms a stop for the upper end of the cap 22 and assures that the cap 22 will not be forced onto the adaptor 18 far enough to engage the end 44 of the needle 20 with any portion of the cap 22. The adaptor 18 is further provided with a tapered section 19 having the conventional taper adapted to fit within a luer taper needle 20. The invention contemplates that the needle 20, being formed of metal, may be removed from the intravenous injection set after initial use, sterilized and reused. Thereafter, the user may be supplied with a set which does not provide such needle, as the previously supplied needle can be easily installed upon the tapered section 19 of a subsequent set.

While there has been described what is at present considered a preferred embodiment of the present invention, it will be appreciated by those skilled in the art that various changes and modifications can be made therein without departing from the essence of the invention, and it is intended to cover herein all such changes and modifications as come within the true spirit and scope of the appended claims.

I claim:

1. In an intravenous set of the type including a cannula for insertion into a supply bottle cork, a transparent drip meter attached to and in communication with said cannula, a tube attached to said drip meter, a flow meter carried by said tube and an injection needle affixed to the end of said tube; the improvement comprising a dished head on said drip meter and a cylindrical boss extending inwardly from said dished head to facilitate formation and counting of drops formed thereon; the other end of said drip meter being provided with an outwardly extending annular flange and a resilient plastic funnel seated on said other end of said drip meter and having a cylindrical wall provided with an internal annular groove adapted to receive said annular flange under tension when said funnel is assembled on said drip meter.

2. In an intravenous set of the type including a cannula for insertion into a supply bottle cork, a transparent drip meter attached to and in communication with said cannula, a tube attached to said drip meter, a flow meter carried by said tube and an injection needle affixed to the end of said tube; the improvement comprising a dished head on said drip meter and a cylindrical boss extending inwardly from said dished head to facilitate formation and counting of drops formed thereon; the other end of said drip meter being provided with an outwardly extending annular flange and a resilient plastic funnel seated on said other end of said drip meter and having a cylindrical wall provided with an internal annular groove adapted to receive said annular flange under tension when said funnel is assembled on said drip meter, and an upstanding ring in said funnel adapted to engage the inner wall of said meter with a press fit to seal same.

References Cited in the file of this patent

UNITED STATES PATENTS

| | | |
|---|---|---|
| 1,205,410 | Tenny | Nov. 21, 1916 |
| 2,638,897 | Poitras | May 19, 1953 |
| 2,644,586 | Cutter | July 7, 1953 |
| 2,681,654 | Ryan et al. | June 22, 1954 |